United States Patent
Lyons et al.

(10) Patent No.: US 11,410,496 B2
(45) Date of Patent: Aug. 9, 2022

(54) SYSTEM AND METHOD FOR COLLECTING AND USING FILTERED FACIAL BIOMETRIC DATA

(71) Applicant: Scientific Games International, Inc., Newark, DE (US)

(72) Inventors: Martin S. Lyons, Henderson, NV (US); Mark S. Ross, Las Vegas, NV (US)

(73) Assignee: Scientific Games, LLC, Alpharetta, GA (US)

( * ) Notice: Subject to any disclaimer, the term of this patent is extended or adjusted under 35 U.S.C. 154(b) by 496 days.

(21) Appl. No.: 16/576,861

(22) Filed: Sep. 20, 2019

(65) Prior Publication Data

US 2020/0098223 A1    Mar. 26, 2020

Related U.S. Application Data

(60) Provisional application No. 62/734,661, filed on Sep. 21, 2018.

(51) Int. Cl.
*G07F 17/32* (2006.01)
*G06Q 30/02* (2012.01)
(Continued)

(52) U.S. Cl.
CPC ..... *G07F 17/3241* (2013.01); *G06Q 30/0269* (2013.01); *G06Q 50/34* (2013.01);
(Continued)

(58) Field of Classification Search
USPC ............................................. 463/29; 382/118
See application file for complete search history.

(56) References Cited

U.S. PATENT DOCUMENTS

| 6,142,876 A | 11/2000 | Cumbers |
|---|---|---|
| 7,175,528 B1 | 2/2007 | Cumbers |

(Continued)

FOREIGN PATENT DOCUMENTS

WO    WO 2009/026180    2/2009

OTHER PUBLICATIONS

Office Action —Canadian Patent Office, dated Mar. 11, 2021.

*Primary Examiner* — Pierre E Elisca
(74) *Attorney, Agent, or Firm* — Dority & Manning, P.A.

(57) ABSTRACT

Disclosed are a system and method for the application of filtering in the collection and application of facial biometrics to a number of problems common to the vending and gaming environments. A succession of video frames of a scene are analyzed to determine if one or more faces are present. If so, the face most relevant to the application based in its position in the scene is selected. The selected face in each of the succession of video frames is then quality rated according to certain criteria to select the best frame for computing a biometric value of the selected face. One the biometric value has been computed, the value may be compared against a database to determine if a biometric value for a matching face was previously stored. If so, the quality rating of the new image and a quality rating previously stored with the stored biometric are compared. If the new image has a higher quality rating than the stored quality rating, the new biometric replaces the stored biometric and its quality rating replaces the associated quality rating in storage. The biometric may then be applied to solving problems of patron analytics, patron loyalty, security and the like.

20 Claims, 7 Drawing Sheets

(51) Int. Cl.
*G06Q 50/34* (2012.01)
*H04N 7/18* (2006.01)
*G06V 40/16* (2022.01)

(52) U.S. Cl.
CPC .......... *G06V 40/165* (2022.01); *G06V 40/166* (2022.01); *G06V 40/172* (2022.01); *G07F 17/329* (2013.01); *H04N 7/183* (2013.01); *G06Q 30/0226* (2013.01); *G06V 40/178* (2022.01); *G07F 17/3239* (2013.01)

(56) References Cited

U.S. PATENT DOCUMENTS

| | | |
|---|---|---|
| 8,243,929 B2 | 8/2012 | Wells et al. |
| 8,457,367 B1 | 6/2013 | Sipe et al. |
| 9,948,902 B1 | 4/2018 | Trundle |
| 2005/0167482 A1 | 8/2005 | Ramachandran et al. |
| 2009/0265105 A1* | 10/2009 | Davis .................. G07F 17/32 348/113 |
| 2012/0072111 A1* | 3/2012 | Davis .................. G07F 17/32 701/523 |
| 2017/0301173 A1 | 10/2017 | Hindsgaul et al. |

* cited by examiner

IPD values (mm) from 2012 Army Survey

| Gender | Sample size | Mean | Standard deviation | Minimum | Maximum | Percentile | | | |
|---|---|---|---|---|---|---|---|---|---|
| | | | | | | 1st | 5th | 50th | 95th |
| Female | 1986 | 61.7 | 3.6 | 51.0 | 74.5 | 53.5 | 55.5 | 62.0 | 67.5 |
| Male | 4082 | 64.0 | 3.4 | 53.0 | 77.0 | 56.0 | 58.5 | 64.0 | 70.0 |

FIG. 3

SYSTEM AND METHOD FOR COLLECTING AND USING FILTERED FACIAL BIOMETRIC DATA

PRIORITY

The present application claims the benefit of Provisional Application No. 62/734,661 filed Sep. 21, 2018.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2018, Scientific Games International, Inc.

FIELD

Embodiments of the inventive subject matter relate generally to wagering game systems, and more particularly to wagering game systems including lottery and casino systems employing filtered facial recognition data.

BACKGROUND

Instant lottery tickets are sold at many types of retail locations including, stores, such as grocery stores, general merchandise stores, and the like. Many such stores feature one or more check-out points or lanes equipped with a point-of-sale (POS) register. The lottery tickets, however, are typically sold at a separate lottery point-of-sale terminal within the same retail establishment.

It has traditionally been difficult in the lottery business to develop rich analytics regarding players. This lack of information has prevented analysis of player-specific buying habits such as whether a specific player exhibits any particular patterns, whether the player prefers a specific game, how often the player purchases, and whether the player is a high value customer. Other valuable business intelligence data may include information on retail statistics as they relate to demographic based player habits according to gender and approximate age. Biometric data may also be employed to provide a low-friction approach to accessing patron loyalty systems in order to provide rewards or to tailor marketing of gaming products according to player preferences. Further, biometric data may enhance security systems related to various gaming products. Other gaming environments, such as casinos and fast food restaurants, may similarly benefit from the collection of facial biometric data. Unfortunately, the collection of facial biometric data in busy establishments such as a store selling lottery tickets or a casino full of gaming machines may include "noisy," data from passersby that is of no use in addressing the above issues. The present invention relates to a unique filtering system and method that addresses the issues identified above, and may provide additional benefits over conventional methodology and systems.

SUMMARY

Objects and advantages of the invention will be set forth in part in the following description, or may be obvious from the description, or may be learned through practice of the invention.

In accordance with aspects of the invention, a system is provided for the filtered collection of facial biometric data and application of that data to enhance the operation of a retail establishment. The type of retail establishment may vary widely within the scope and spirit of the invention. For example, in certain embodiments, the retail establishments may be convenience stores, gas stations, pubs, restaurants, some of which may sell lottery tickets to the public. The retail establishment may also be formal gaming venues such as casinos, racetracks and the like. The present system has particular usefulness for much larger retail establishments, such as "big-box" retail stores that are part of a national or other geographic chain, wherein the sale of lottery ticket sales has generally not been implemented, or in single- or multi-property casinos. A succession of video frames of a scene are analyzed to determine if one or more faces are present. If so, the face most relevant to the application based in its position in the scene is selected. The selected face in each of the succession of video frames is then quality-rated according to certain criteria to select the best frame for computing a biometric value of the selected face. One the biometric value has been computed, the value may be compared against a database to determine if a biometric value for a matching face was previously stored. If so, the quality rating of the new image and a quality rating previously stored with the stored biometric are compared. If the new image has a higher quality rating than the stored quality rating, the new biometric replaces the stored biometric and its quality rating replaces the associated quality rating in storage. The biometric may then be applied to solve the above-identified player analytic, player tracking and security problems, among others.

In certain embodiments, the system includes one or a plurality of retail point-of-sale (POS) registers wherein patrons of the establishment purchase goods. A lottery ticket terminal is configured in communication with the retail POS register to accept a request for purchase of a particular lottery ticket selected from a plurality of different lottery tickets. For example, a patron's request for a particular scratch-off lottery ticket is inputted to the lottery ticket terminal by a retail clerk or other employee of the establishment.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

FIG. 3 is a table of inter-pupillary distances (IPD) in accordance with aspects of the present invention;

DETAILED DESCRIPTION

Figure 1:
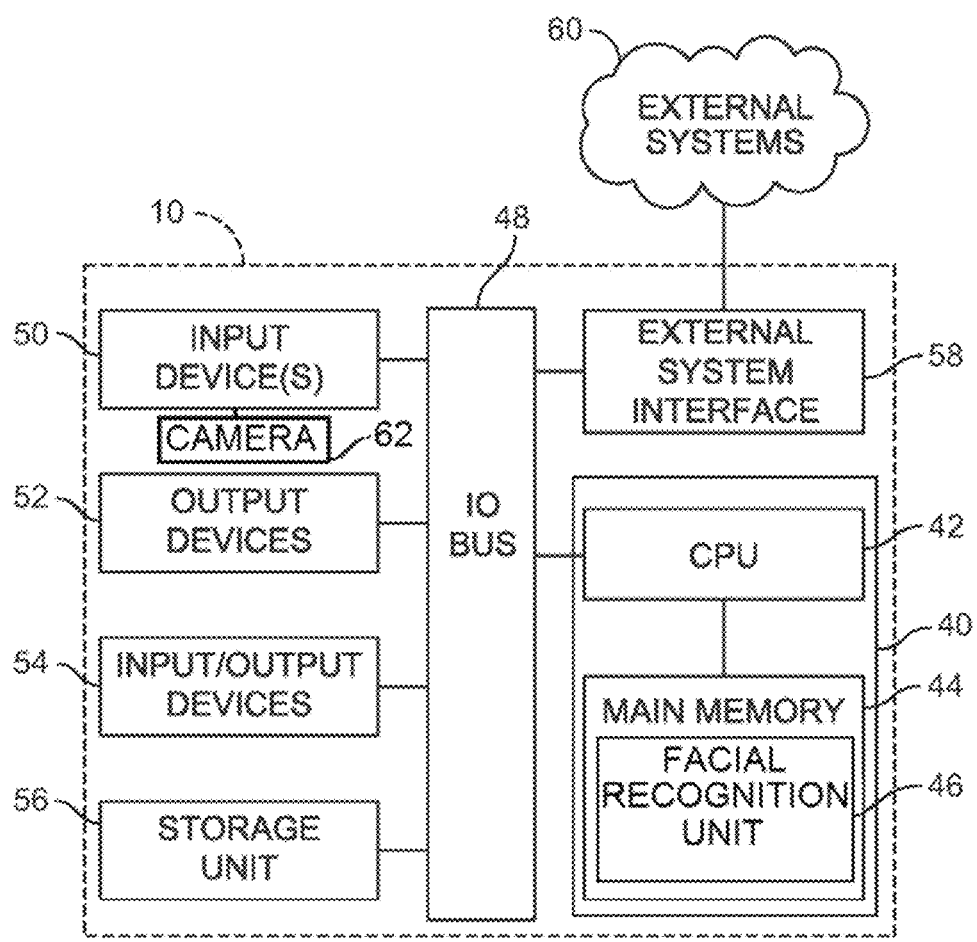
FIG. 1 is a block diagram of a system and associated methodology in accordance with aspects of the present invention.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Certain aspects of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

For purposes of the present detailed description, the singular includes the plural and vice versa (unless specifically disclaimed); the word "all" means "any and all"; the word "any" means "any and all"; and the word "including" means "including without limitation."

For purposes of the present detailed description, the terms "lottery game", "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as is typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

A retail establishment or location, such as a retail store, convenience store, pub, restaurant, or the like, is generally authorized by a lottery jurisdiction to carry out lottery activities, such as the sale of instant scratch-off tickets or terminal printed draw tickets for games such as Powerball™. The lottery jurisdiction may be a state lottery authority, such as the Pennsylvania Lottery, or any other governmental jurisdictional authority. A separate game provider may be partnered with the lottery jurisdiction to provide certain control, implementation, and logistical functions of the game. It should be appreciated that the type of retail establishment or lottery jurisdiction entities are not limiting factors of the invention.

Although not limited to such, the present system has particular usefulness for larger retail establishments, such as "big-box" retail stores that are part of a national or other geographic chain. It should be appreciated that the invention encompasses a single retail establishment, as well as a multitude of establishments. The retail establishment includes one or more retail point-of-sale (POS) registers wherein patrons of the establishment purchase goods. Typically, a scanner is associated with the POS register to scan a UPC code on the products, with the UPC code linked to a purchase price and identification of the products, as is well-known in the art.

A lottery ticket terminal may be configured in wired or wireless communication with the retail POS register to accept a request for purchase of a particular lottery ticket selected from a plurality of different lottery tickets made available to patrons for purchase. This request may be input directly to the terminal or come via the POS register. The lottery tickets may be, for example, conventional instant scratch-off lottery tickets. Various types of lottery ticket terminals are known in the art and suitable for configuration with a system in accordance with the invention. For example, Scientific Games Corporation having a principal place of business in Alpharetta, Ga., USA, offers Flair™ and Wave™ lottery ticket terminals that may be readily configured by those skilled in the art for a system as described herein. A patron's request for a particular scratch-off lottery ticket may be inputted into the lottery ticket terminal by a retail clerk or other employee of the retail establishment by various means. For example, in accordance with one or more embodiments, a commercially-available Scientific Games Corporation SciQ™ "smart" lottery ticket dispenser array may be in wired or wireless communication with the terminal. This dispenser array includes one or a plurality of individual lottery ticket bins with each bin typically containing a different respective lottery ticket game. For example, one bin may contain "Lucky 7" themed scratch-off lottery tickets, while an adjacent bin may contain "Gold Rush" themed scratch-off lottery tickets, and so forth.

In accordance with one or more embodiments, rather than a clerk-operated retail terminal as described above, self-service lottery vending machines such as, but not limited to, PlayCentral HD, PlayCentral EX and the PlayCentral 54, also by Scientific Games Corporation, may also be used to dispense lottery tickets. For the sake of simplicity, in this disclosure, both a clerk-operated retail terminal and a self-service lottery vending device may be broadly defined as a "vending device."

With reference to FIG. 1, there is shown a block diagram of an exemplary vending device architecture. The vending device 10 includes circuitry 40 securely housed within a locked box inside the vending device. The circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Circuitry 40, as used herein, comprises any combination of hardware, software, or firmware disposed in or outside of the terminal 10 that is configured to communicate with or control the transfer of data between the terminal 10 and a bus, another computer, processor, device, service, or network. The circuitry 40, and more specifically the CPU 42, comprises one or more controllers or processors and such one or more controllers or processors need not be disposed proximal to one another and may be located in different devices or in different locations. The circuitry 40, and more specifically the main memory 44, comprises one or more memory devices which need not be disposed proximal to one another and may be located in different devices or in different locations. The circuitry 40 is operable to execute all of the various methods and other processes disclosed herein. The circuitry 40 is also connected to an input/output (I/O) bus 48, which can include any suitable bus technologies, such as an AGTL+frontside bus and a PCI backside bus. The I/O bus 48 is connected to various input devices 50, including at least one camera 62, output devices 52, and input/output devices 54. The I/O bus 48 is also connected to a storage unit 56 and an external-system interface 58, which is connected to external system(s) 60.

The main memory 44 includes a facial recognition unit 46. In one embodiment, the camera(s) 62 provide a live video stream to the facial recognition unit 46. The facial recognition unit 46 may include an off-the-shelf facial recognition software solution, such as one provided by Clarecepto, Vision Labs, Cognitec, and the like. The live video stream is processed by the facial recognition unit to generate facial biometric data. The facial recognition software solution provides a software developers kit (SDK) with basic functionality that allows the facial recognition unit 46 to input faces from the view provided by the camera(s) 62 into the facial recognition software solution and receive corresponding biometric(s) back. For example, the system may determine how many faces are found in a view, the approximate age of the faces found, and the genders of the faces found, as will be described more below.

The external system 60 includes, in various aspects, a network (e.g., a lottery system network, as described in Appendix 2), other vending machines or terminals, a lottery ticket server, a patron loyalty database, a remote controller, communications hardware, or a variety of other interfaced systems or components, in any combination. The vending device 10 optionally communicates with the external system 60 such that the vending device 10 operates as a thin, thick, or intermediate client. The circuitry 40—whether located within ("thick client"), external to ("thin client"), or distributed both within and external to ("intermediate client") the vending device 10—is utilized to provide lottery ticket vending via the vending device 10.

Figure 2:
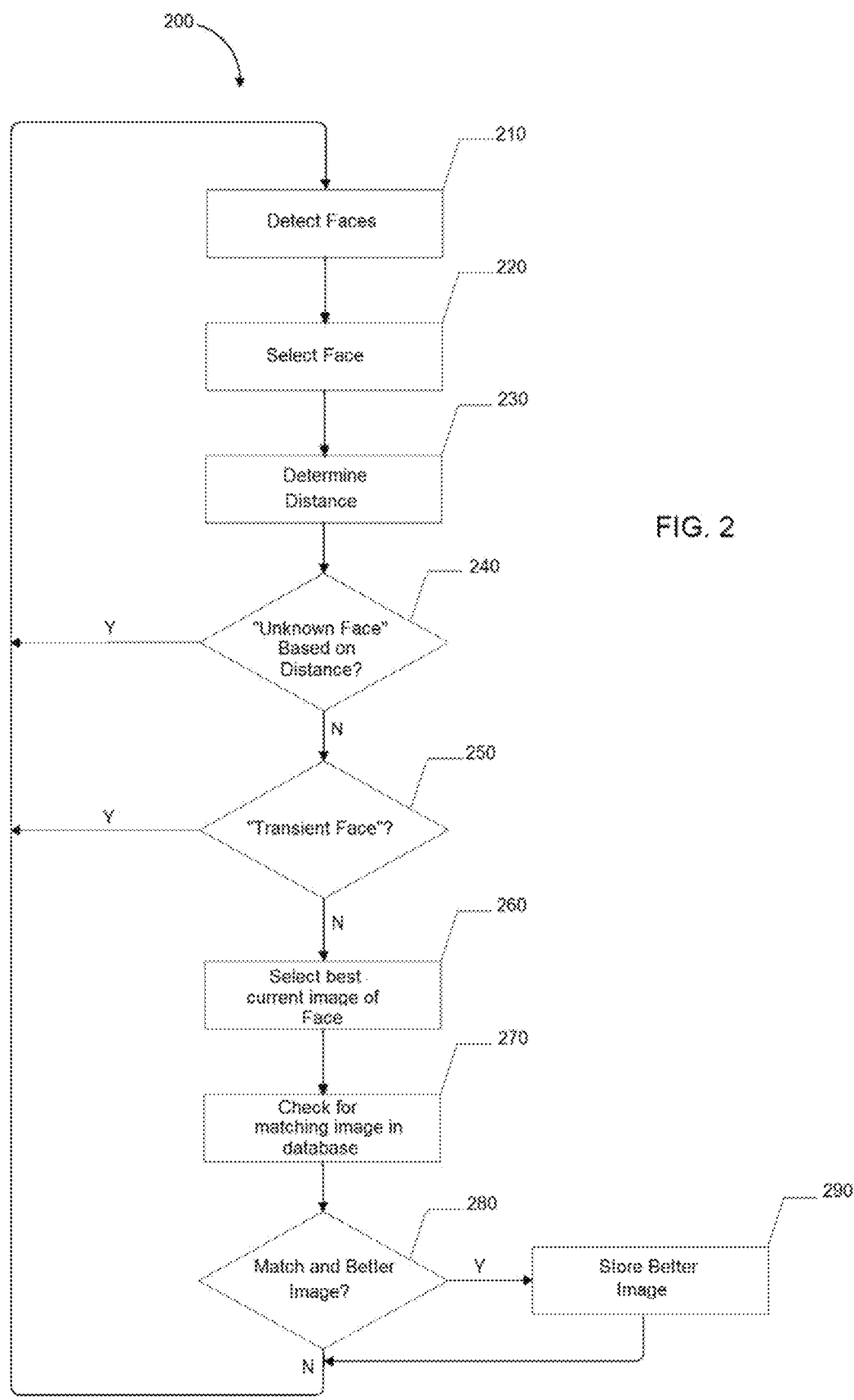
FIG. 2 is a flowchart of a method in accordance with aspects of the present invention.
Figure 6:
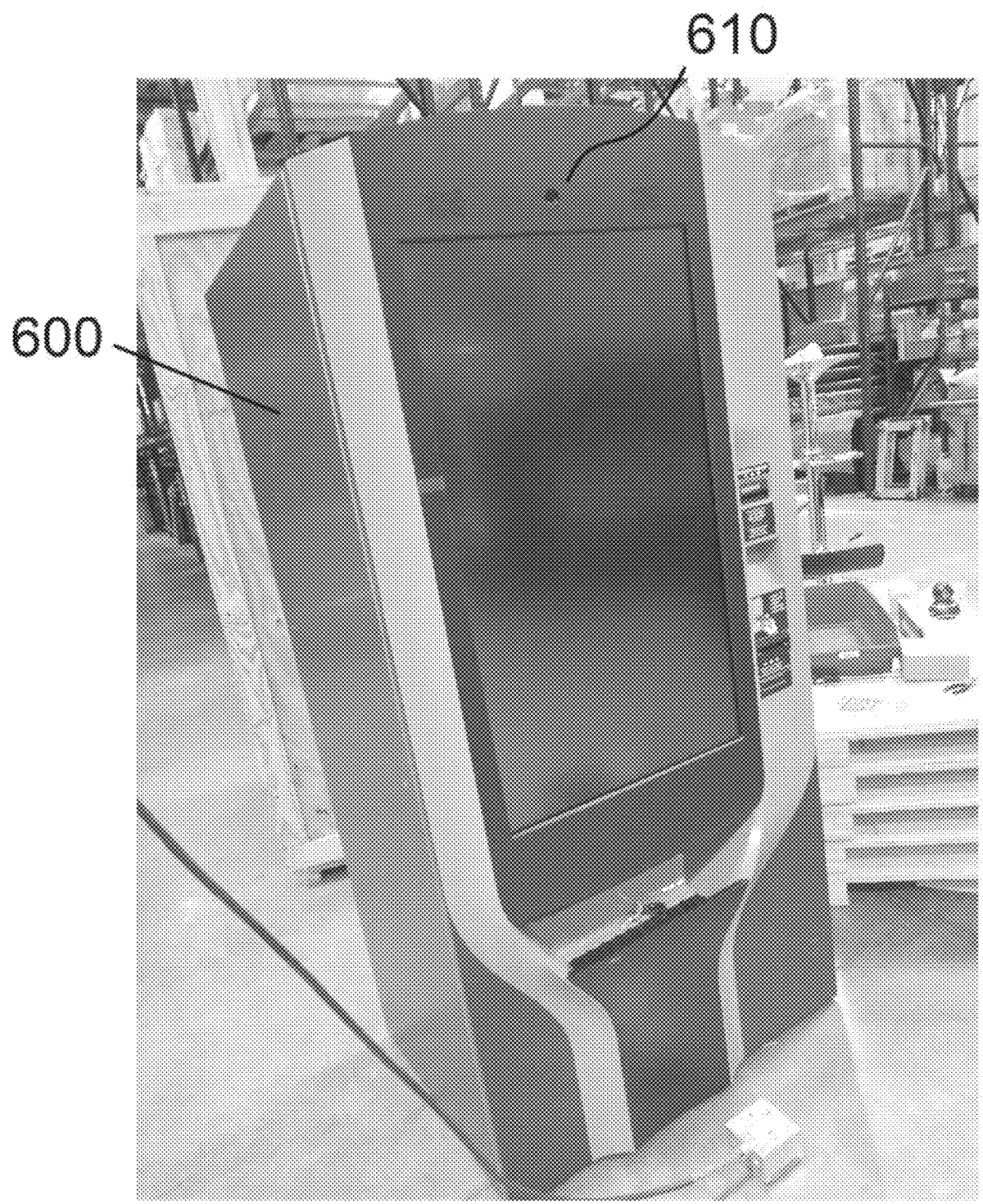
FIG. 6 illustrates a lottery ticket vending device including a camera in accordance with one or more embodiments.

The vending device 10 may include additional peripheral devices or more than one of each component shown in FIG. 2. Any component of the vending device architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc. Of particular importance to this invention is the inclusion of the camera(s) 62 and the facial recognition unit 46. For example, FIG. 6 illustrates one embodiment, in which a single camera 610 is incorporated into the cabinet of a PlayCentral™ HD 600.

Returning to FIG. 1, once the facial recognition unit 46 has a sequential stream of images, it further addresses the issue of what to do with data related to any faces detected in the images. For example, in a 7-11 store with a lottery vending machine, there may be thousands of faces walking past the machine each day. Nearly all of those faces are irrelevant to the vending device 10. At the vending device 10, the principal need to know is which of the faces in the video feed is actually the person operating the machine. The facial recognition unit 46 thus addresses the question, "Who, if anyone, is of interest in this video feed?"

The vending machine thus extends the functionality of previous basic facial biometric solutions by discriminating between faces it may be temporarily interested in rather than permanently. Transient faces are of little to no interest, though they may be used to collect general demographic or traffic data, as will be described further below. Information may be derived from their detection, but there is no attempt made to identify the individuals. For example, if a patron walks up to a vending machine, operates its controls, but then walks away without buying anything, the vending machine assigns little value to identifying or keeping any biometrics about the person.

The system divides detected faces into three classes of faces—unknown, transient and known. Transient faces are faces that have not been seen for long enough to care about. Operation of a lottery vending machine takes at least a few seconds. So, as noted above, the system filters out anyone who only appears for less than, for example, three seconds. If a face is seen for the required, say, three seconds, and cannot be associated with any prior bet or purchase, it is promoted from transient to "unknown." It stays "unknown" until one of two things happen. Either the face disappears for more than the required amount of time, in which case it is deleted as a transient, or a qualifying interaction with the vending machine, such as a purchase, is made while this face is the most central face (as described below). In the latter case, the face is promoted to being a "known" face. A "known" face is one which the vending device seeks to have an ID associated with it. Its biometric data is stored in the system so that if it ever reappears, it can be incorporated into the techniques described above. For example, a purchase history for the person may be built.

In accordance with one or more embodiments, and referring to FIG. 2, a method 200 of capturing, matching and storing a biometric of a "known" face is presented. The order of actions as shown in FIG. 2 and described below is only illustrative, and should not be considered limiting. For example, the order of the actions may be changed, additional steps may be added or some steps may be removed without deviating from the scope and spirit of the invention.

At step 210, a video frame is analyzed for the presence of any faces. For example, the "MTCNN" algorithm, when fed an image, will return a list of rectangles containing faces.

At step 220, the camera image is then segmented into a set of polygons representing each area of interest—at a vending machine there would likely only be one polygon. At, for example, a casino gaming table, as discusses further below, there may be one polygon for each patron position. Each polygon has a pre-determined center point, which may not be the mathematical center. Rather, it is where the optimal position of a nose on a face should be for a person operating the vending machine. In each image, the system counts the number of faces that have a nose position within each polygon. If there is only one face, that face is used. If there is more than one face, and one face is significantly nearer to the camera, that face is selected for use. If multiple faces are at similar distances, the face with the nose closest to the center point is selected for use.

At step 230, a determination of the approximate distance from the camera of each face in a captured image is made. Known measurements of faces may be used to calculate the three-dimensional position of each face with respect to the camera. For example, over 90% of human eyes have a distance between the pupils of 63 mm+/−7 mm. FIG. 3 provides an example of sampled inter-pupillary distances (IPD). For reference, one may also examine: https://en.wikipedia.org/wiki/Pupillary_distance.

Referring back to FIG. 2, at step 240, once the distance of each selected face has been determined, any face that is more than a reasonable distance away from the camera is filtered out. For example, a person more than a meter away from the vending machine is probably unable to operate it and is of no interest. The face is considered "unknown" and the method returns to step 210.

At step 250, a face of interest must appear in a sequence of captures for at least, as an example, three seconds. This also addresses a scenario in which a user may temporarily cover their face or turn their head from the camera—active faces remain active providing there is another valid capture within, for example, three seconds. If a face fails to remain active, it is considered "transient" and is filtered out. The method returns to step 210.

At step 260, if not filtered out, and because it has multiple sequential images of a single face from the video stream, the facial recognition unit further extends basic facial biometric solutions to select the best image to be used as a reference for the actual current biometric generation. There are clearly some facial captures that are better than others—for example, a passport photo is a very good use for biometrics. At electronic passport controls in various countries, great effort is made to have a person stand in a particular place and look directly at the camera to get a good scan. Unlike those applications, the present vending machine application is designed not to have patrons do anything special to be tracked and, thus, must choose the best image from the set of images it has. Thus, the quality of a biometric for each of a series of images is rated based upon the "pose," the calculated pitch, roll and yaw angles of the current face. Known algorithms are used to determine the angles of each face with respect to the camera—pitch, roll and yaw, with roll addressing how much the face is tilted to the side, pitch addressing how much the face is tilted up or down, and yaw is how much the face is turned to the left or right. An exemplary algorithm for calculating the angles of the face with respect to the camera's position may be found at https://www.learnopencv.com/head-pose-estimation-using-opencv-and-dlib/.

Figure 7:
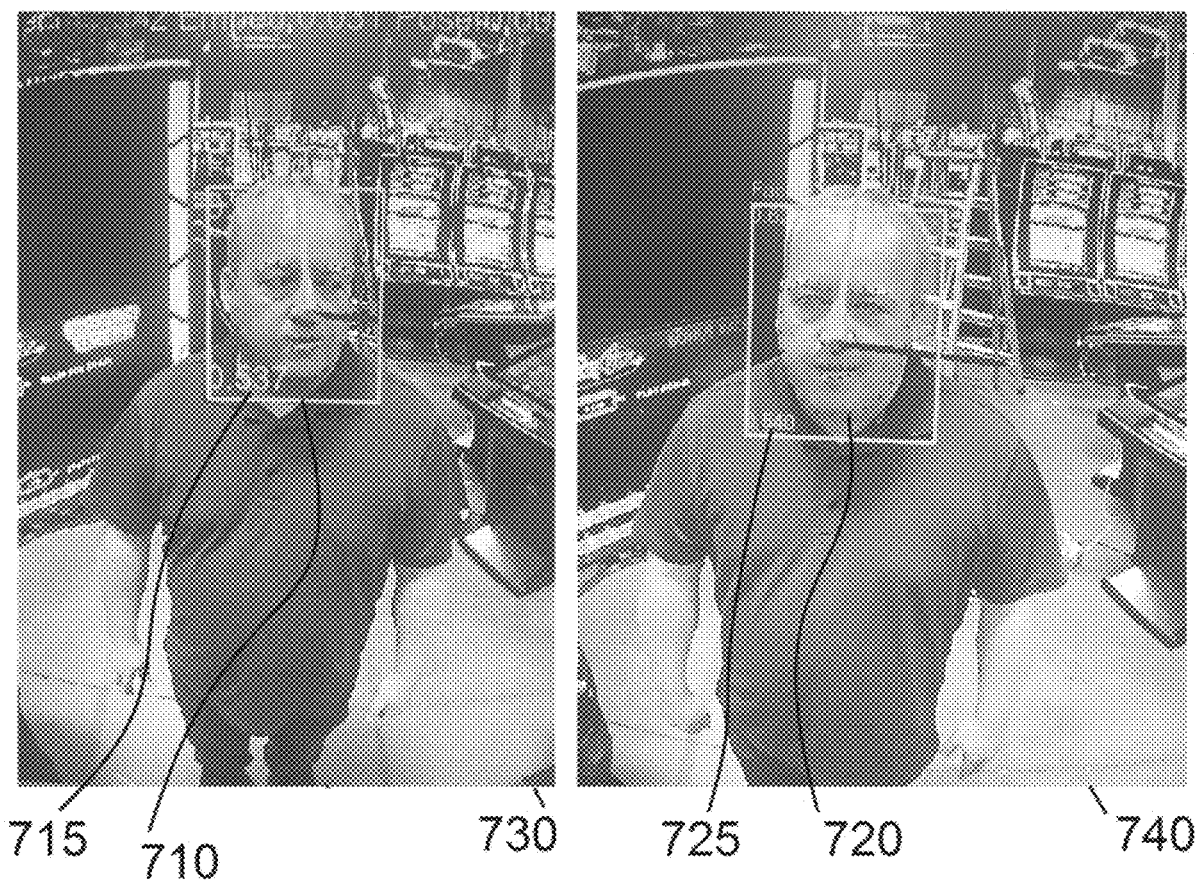
FIG. 7 illustrates two images for quality comparison in accordance with one or more embodiments.

Known algorithms may also be applied to rate the sharpness of a face capture, with images blurred by movement rated as being weaker samples than steady face images. For example, an algorithm such as the one described at https://www.kurokesu.com/main/2016/07/27/opencv-3-python-blur-detection/ may be used. Other known algorithms can return relative (often as many as 68) positions of landmarks on a face against a reference model of a human head. The more detected landmarks detected, the higher the rating for use as a biometric. An example of such algorithms may be found at https://www.pyimagesearch.com/2017/04/03/facial-landmarks-dlib-opencv-python/. FIG. 7 illustrates two graphic portrayals 710 and 720 of combinations of distance, pose, sharpness and landmarks used to establish respective ratings 715 and 725 for a first image 730 and a second image 740 of a patron. In the example shown, the second image 740 would be selected because its rating 720 of 0.540 is slightly better than that of the first image 730, which has a rating 715 of 0.537.

Returning to FIG. 2, at step 270, once the best frame to use has been determined, that frame may be compared against a database of images for each patron in the system. One algorithm for performing this comparison is described in the article "FaceNet: A Unified Embedding for Face Recognition and Clustering" incorporated herein in its entirety for all purposes.

At step 280, if a match is detected and the current image result has a higher rating (i.e., with better angles (generally closer to zero), a closer distance, better sharpness or more landmarks) than the previously held capture for the identified individual patron, the older image is replaced by the new one at step 290. Thus, over time, better and better samples of a person's face are captured. The stored samples are far less likely to cause false positives or negatives in future attempts to identify the person than if only a single original capture is stored. The method then returns to step 210.

Player Analytics

In accordance with some embodiments, the facial biometric analysis may be broken up into zones (geographically marked off areas on-camera) in order to determine where faces were found in the camera frame. This allows for determining where in the retail establishment are people congregating, whether these areas obstruct lottery purchases, whether the lottery point of sale device is in an optimal location in the store, whether there is a person in front of or in-line for a lottery point of sales device or terminal, how many people a day engage with the lottery point of sale device, the size of any line of people waiting to make purchases at the lottery point of sales device, how much foot traffic does the retail space have overall, including tabulating for the lottery areas of the store any combination of time, gender and approximate age. Once this information is obtained it is possible to develop a heat map of the retail establishment.

For example, it may be observed through the biometric analysis that people are congregating at the coffee station at a convenience store. It may make sense to move the lottery point of sales to the coffee area. It may be observed through biometric analysis that the floor traffic stops midway through the convenience store floor (a "dead zone"), and the lottery point of sale device is located at the end of the store such that patrons rarely walk near the machine. It may be observed that 1,000 unique people pass in front of the point of sale device per day. It may be observed that the average length of a line at the point of sale device is five people, and lines get longer at 6:00 and 12:00 PM, while lines are at their shortest at 10:30 AM. It may be observed through biometric analysis that, earlier in the day, women buy scratch tickets, but not draw tickets.

Additionally, using this tabulated data, it is possible to compare lottery retail establishments against each other and determine trends that may be used to help retailers fine tune their establishments to better serve their lottery patrons.

In accordance with one or more embodiments, each time a biometric analysis of a scene is performed, a unique biometric ID may be assigned to each new face if it can be ascertained the patron has not been seen before. If the patron has been seen before, analysis can determine whether this patron been coming to the point of sales device (vending machine, lottery terminal, or bin), and not making a purchase. If so, how often does this happen, is there a pattern that can be deduced, and can additional biometric information such as age and gender be attributed to any pattern? Does this repeat patron have any kind of purchasing patterns with respect to games selected and amount wagered? Can this be matched to age and gender? Is this is a high value patron?

For example, it may be known that a male between the ages of 55 and 60 has started to make a scratch ticket purchase at the point of sale device. He has been to the same device 40 times. His typical purchase is $150, which in this store makes him high valued. 25 out of 40 times, he has changed his mind and abandoned his shopping cart on the device. In the 15 times that he has made his $150.00 purchase, it was for scratch tickets with a gold theme. In the 25 times that he has abandoned his purchase, tickets with a gold theme were not available. In order to increase this patron's spend, more gold themed tickets may be needed.

In another example, it may be known that a recognized female around age 30 comes into the establishment purchases only $1.00 scratch cards for certain games with a cat theme.

As each patron is biometrically identified as to whether or not they are a repeat patron and their gender and approximate age have been established, deep trend analysis becomes possible. Entire lottery retail establishments or collections of retail establishments may be analyzed to determine purchasing trends across gender and age.

For example, scratch ticket patrons at retailer locations at a particular part of the city are mostly female with ages from 20 to 30, while scratch ticket patrons at retailer locations in an opposite part of the city are typically male between the ages of 45 and 55. Women between the ages of 45 and 65 often buy scratch tickets with a hearts theme. Men between the ages of 45 to 55 buy scratch tickets with car themes and at $5.00 denominations. Males ages 25 to 45 spend an average of $20 a week on daily draw games. Women ages 20 to 30 only buy scratch tickets that are a $1.00. If it is determined that scratch ticket buyers at a particular location are mostly women between the ages of 20 and 30, that retailer might modify their mix of games to be heavier in $1.00 denominations. Similarly, if a particular location skews male and 45+ years of age, that retailer might increase their supply of $5.00 car-themed scratch tickets.

In accordance with one or more embodiments, because such deep analytics become available as a result of biometric analysis, the devices which sell lottery tickets (scratch tickets, and draw tickets), may be modified to create situations to increase sales. For example, a point of sale device deployed in a retailer location that skews male and a male of a certain age may show games/themes that are known to appeal to this demographic. In another example, a SciQ™ device (identified above) may be equipped with digital signage. Based on the biometric analysis of the mix of patrons in line to purchase scratch tickets, the digital signage could show commercials/ads for scratch tickets that will appeal to that particular line's demographics.

Although 44 states out of 50 have lottery programs, fewer than 25% have patron loyalty programs. The states which do lottery loyalty programs are hindered by inefficient, and high friction methodologies in order for a lottery patron to receive credit for purchases. In one such methodology, patrons must enter a code from their purchased ticket. In another methodology, patrons are required to scan a ticket utilizing a mobile app. Both methodologies require manual effort on the part of the patron, and as a result may discourage participation and engagement in the loyalty program. Discouraging patron participation and engagement prevents a loyalty program from reaching its full potential such as enabling patron development by building a relationship with the patron, aligning promotional offers to patron preferences, ascertaining which products are in sync with which patrons, making intelligent decisions for new product development based on characteristics of patrons in the loyalty program, etc. Finally, a successful patron loyalty program generates enough data to create analytics.

Player Loyalty

Patrons typically enroll in loyalty programs either online or through a mobile application. In accordance with one or more embodiments, the use of facial biometrics allows a patron to go to a property with lottery sales and add their biometric information to their loyalty program account. For example, a PlayerCentral HD™ is modified to allow a patron to enter their loyalty identification number, and have the device assign to it a biometric identifier based on facial recognition. In another example, a SciQ™ is modified to allow a patron to enter their patron loyalty identification number, and have the device assign to it a patron biometric identifier based on facial recognition. No matter which methodology a patron uses to bind their biometric data to their patron loyalty identification number, after the biometric binding, patron loyalty becomes seamless and frictionless.

In these embodiments, each sales device has biometric recognition and the patron has willingly identified themselves biometrically. Upon a purchase, the item purchased is recorded. If a biometric match is made to the enrolled patron, the patron instantaneously receives loyalty point accrual for the purchase with no need for any further steps. The patron keeps playing, and every transaction is automatically registered to the loyalty program. Additionally, once a patron has been biometrically bound to the loyalty system, any biometrically enabled lottery device can identify the patron before and after a transaction.

In accordance with one or more embodiments, a patron can be given a real-time promotional option before deciding on a purchase in order to entice them. For example: A patron has enrolled in the lottery's loyalty program. The patron has also enrolled in the biometric identification program. The patron goes into a lottery establishment with a biometrically enabled lottery device. Upon tracking the patron's entrance to the establishment, the patron may be sent a message (for example, via SMS, or directly to the patron's lottery application on their mobile phone), with a special offer. The patron might be offered double the loyalty points if they make a particular kind of purchase immediately.

In another embodiment, assuming enrollment in both biometric identification, and the lottery loyalty program, the loyalty promotions made available to the patron may be custom tailored based on the patron's determined gender and approximate age. For example, when a patron enters a lottery retailer that has a biometrically enabled device, their loyalty user interface or promotional offer may differ. For the purposes of this example, we will assume that the "James Bond" license is in effect, and patron is using a mobile app to interact with the loyalty program. If the patron is male, and over the age of 45, his patron loyalty program might show a promotion with Sean Connery as James Bond. If the patron is male and under the age of 45, his promotion might show Daniel Craig as James Bond. If the patron is female and under the age of 45, her promotion might show Naomie Harris as Miss Moneypenny. If the patron is female and over the age of 45, her promotion might show Judi Dench as M.

Similarly, in accordance with one or more embodiments, utilizing the biometric demographic information determined at the time of the patron's biometric facial recognition enrollment, the patron's mobile app may include biometrically aware skins on its user interface. Additionally, SMS messages may be custom tailored in real time to take patrons to links specific to their demographic group, for example, to a website page based upon their demographic information.

Player Preferences

Typically, lottery instant game sales are 100% anonymous. There are no methodologies to make game purchase suggestions based upon patron preference or precedence. In accordance with one or more embodiments, since each purchase will be identified by unique biometric data, it is possible to identify a new or repeat patron. Upon identifying a repeat patron, it will be possible to use patron precedence/preference to suggest instant games to purchase. By utilizing this precedence/preference data, additional instant game sales may be solicited.

Additionally, utilizing biometrics opens up new opportunities for draw based games such as lotto or daily numbers. Daily draw patrons are notoriously superstitious about their numbers, and often repeat play their numbers. By identifying a patron biometrically, it is possible to biometrically bind their daily number selection preferences to them. When a repeat patron appears at a lottery terminal or lottery vending machine, it is now possible to pre-populate their daily number selection based upon prior selection. This has the additional advantage of speeding up the rate at which daily draw games can be played.

In accordance with one or more embodiments, using precedence and anonymous biometric identification, the user interface of the lottery point of sale device may be re-arranged based on a historical order of transactions. If a repeat patron has been known to play a certain type of game first (draw for example), the user interface presented to this patron may be re-arranged so that this type of game is the first item on the list, which allows the patron to get to the game type they wish to play more quickly.

Upon making a purchase, if the patron is a new patron, a unique ID is assigned to the patron based on their biometric data. This unique ID is bound to the biometric data that is unique to that patron. If the patron is a repeat patron (they have made a purchase before), their unique ID is retrieved. At time of purchase the unique ID is bound to the purchase transactions made by that patron. At no time, is any personal information that would identify the patron's real world identity (name, image, address, phone number, etc.) recorded. In the case of a repeat patron, their purchase history is retrieved based upon their unique ID. This purchase history is utilized to enable a patron preference based user interface. There are three specific embodiments of this idea: patron preferences based on prior purchases, patron preferences based on prior numbers select for draw games, and patron preferences utilized to re-arrange the user interface based upon preferred transaction flow.

When capturing biometric data for patron preferences, it is potentially possible that more than one face may be in view at any given time. This might be particularly true if the patron is accompanied by small children. In accordance with one or more embodiments, a specific zone or region in the image may be considered the primary face to associate with patron preferences. Additionally, if additional faces are outside of this zone, and/or the approximate age is considered to be underage for the purchase of lottery products, these faces may be excluded from all facial tracking.

As stated previously, upon a patron making a purchase, their purchase information is recorded with their unique ID. If no unique ID is present, one is generated. This binds the patron's biometric information to their unique ID. All purchases made by the patron are recorded. When the patron returns to the lottery point of sale device, the camera, and facial recognition solution determines if this is a repeat patron. If so, their unique ID is retrieved along with their purchase history. The user interface screen is modified such that the items that the patron has purchased previously are located at the top of the display list of items available for purchase. Additionally, it is possible that related products may also be moved in their ordering on the display list for purchase.

In a very specific example, patron A comes to a lottery point of sale device. Patron A purchases a set of scratch tickets of a certain denomination, and brand. Patron A is a new patron, and a unique ID is generated for him, and his purchases are associated with it. Patron A later comes back for another round of purchases. This time, when the patron selects scratch tickets, the display list is re-ordered in order to reflect that the last time around, the patron selected a very specific ticket, and the tickets of the same denomination have been ordered right after it. Here is an example of an embodiment of the invention. If a new patron purchases a $5.00 Leprechaun Loot instant game, the information is stored. Upon a repeat visit by the same patron, the user interface is modified as shown, with 'Leprechaun Loot' first and additional $5.00 options after it based on the preference the patron has to Leprechaun Loot and $5.00 instant win games.

In the case of a ScIQ™ device, there may be no user interface to be retrieved. However, patron preference may still be reflected. Patron A visits a ScIQ™ located at a convenience store. Patron A is biometrically identified as a new patron and a unique ID is generated for Patron A. Patron A purchases XYZ scratch ticket, and his purchase history is bound to his unique ID. Patron A later returns to the ScIQ™. Patron A is biometrically identified as a repeat customer, and his unique ID is retrieved with his purchase history. The ScIQ™ identifies the patron to the clerk as a repeat patron, and also what the patron purchased previously such that the clerk operating the ScIQ™ is given an automated suggestive sell script. The clerk may then say to Patron A, "The last time you purchased XYZ. Would you like to purchase that again? Also we have another ticket with the same purchase price. Would you like to purchase that as well?"

In a specific example, a patron purchased "Leprechaun Loot" in a prior visit to a convenience store. Leprechaun Loot is a $5.00 scratch ticket. Upon returning to the convenience store, the patron is biometrically recognized as a repeat patron. The patron's purchase information is retrieved. The clerk receives an alert box with the patron's prior purchase, and is given a sales script to offer the prior purchase and a suggested pairing based on the prior purchase being a $5.00 scratch ticket.

Thus, for example, the system allows a patron to walk up to a vending machine, select some numbers and buy a lottery ticket. The patron can walk away and come back the next day. When they touch the screen to begin, the vending machine will already have recognized them. When they are ready to select numbers, the machine may present one or more sets of their previous numbers and prompt, "Do you want to use these numbers from last time?" The patron does not need to log in, insert or swipe a card, or do anything special.

Currently, lottery instant games have known security issues: Ticket loss/Ticket theft—If a patron loses a ticket, or has is ticket stolen there is nothing preventing someone else from cashing in a winning ticket. (Unless patron has already signed the back of the ticket.) Underage ticket purchase—Currently operators utilize clerk discretion, or other property based countermeasures, in order to deter underage gambling. At a lottery instant game vending machine there is no age verification at all. Worse, if an underage patron purchases a ticket, and the ticket is a winner, the patron cannot cash in the ticket, and the winning ticket prize is taken out of contention for a potential legal age patron. Recently, there was an incident in the state of California where a 16-year-old acquired an instant ticket for his father, who was of legal age, and the ticket was a winner. Because the ticket was acquired by a minor, the father was denied the $5-million-dollar prize. Clerk oversight—Currently the lottery industry has to deal with scams and fraud that are related to the clerk operating a lottery sales counter: A lottery clerk misrepresenting the payout on a winning instant game—In one scenario the clerk will inform patron that winning ticket was a loser, and clerk will attempt to cash the ticket for themselves. In another scenario the clerk will report that ticket was a low prize winner, pay the patron out of their own funds, and later cash in the ticket for full value. In order to address this, state lottery commissions must send undercover agents to the field and perform compliance checks. For example, in 2013, the Wisconsin Lottery investigated a half dozen cases of store clerks stealing prizes from customers. In another case, a lottery clerk will partially scratch off a ticket, and ascertain whether or not it is a loser. The clerk will sell the losing tickets to patrons, and later sell the winning tickets to themselves. In order for an operator to have a successful lottery, trust in the lottery itself must be absolute. If a lottery loses the trust of its patrons, sales will diminish. Lottery commissions in each state must deal with numerous accusations against lottery operators and clerks each year. The Michigan Lottery receives approximately 1,500 complaints per year. In addition to clerk and patron issues, lottery vending machines, just like any other vending machine, may be subjected to tampering issues: Physical tampering—patron attempts to open the device, and steal cash and/or tickets. Card skimmers—in the jurisdictions where cashless play is allowed, machines can accept credit or debit cards. This makes machines susceptible to the same card skimming schemes used at gas pumps. Although lottery agencies provide rules for where vending machines should be placed in order for them to be under constant observation, in some cases machines are still deployed on properties under obstructed views.

Security Operations

In accordance with one or more embodiments, the above-described camera that is utilized for obtaining biometric facial data from a lottery patron, and in some cases a clerk, may be employed to address some of these security risks. For example, a ScIQ™ is modified to have two cameras. One camera is patron facing and the other is clerk facing. These cameras are integrated with facial recognition software as described above in order to obtain biometric facial data.

Using the patron-facing camera, before a purchase occurs, the system may use biometric face recognition to determine the patron's approximate age (within a confidence interval). If the patron's age is not within legal gambling age, the transaction may be halted with an alert to a clerk to perform age verification. During the purchase, the system may record the patron's biometric information and, if the patron has opted in, allow biometric binding to the specific ticket purchased. The biometric data is stored anonymously with the ticket information. If anyone other than the stored patron attempts to cash in the ticket, biometric verification will fail and an alert and other appropriate action will be taken in order to protect against fraud. In accordance with one or more embodiments, the patron may allow binding to his loyalty ID or personal information. If someone other than the patron attempts to cash-in a ticket, the patron can be directly alerted by SMS or via a lottery application on their mobile phone. If the patron can verify that ticket is no longer in their possession, the patron can alert authorities that the ticket has been stolen and that someone has attempted to redeem it. During redemption, if the patron opted-in for biometric identification, the system can verify that the true owner is redeeming the ticket. In accordance with one or more embodiments, if the patron opted-in for biometric identification and the ticket was lost, the system can potentially utilize the patron's facial biometric data to redeem the lost ticket, deactivating the physical ticket in the database in case it is later found.

Utilizing the clerk facing camera, the system may biometrically identify and log the clerk as the operator of the ScIQ™ and any other lottery devices. The system may verify that the identified clerk is authorized to use the equipment. Since the identity of the operator is known at all times, the system may use this biometric information to verify if any shrinkage or accounting irregularities occur. Upon each ticket being dispensed from the bin, the system may bind the ticket dispensed to the authorized clerk. If a ticket is later found to be pre-scratched, the clerk associated with its sale may be questioned. If a ticket has been dispensed without payment (stolen), again, the clerk can be investigated for collusion. Upon each ticket redemption from a patron, the system may bind the redemption to the clerk's biometric information. If the clerk fails to pay out appropriately, the clerk can be identified. The system may also perform other fraud tests. For example, a check can be made to determine if a patron is also the clerk who sold the winning ticket at another venue. If a clerk is associated with a stolen ticket and attempts to cash it in at a different lottery counter, the clerk will be biometrically identified. This prevents the clerk from reporting a ticket as a loser or small winner, and taking the ticket elsewhere and cashing it in for full prize value.

In accordance with one or more embodiments, anonymous biometric data may be captured. In case of any kind of machine tampering, a match of biometric data of patrons to the biometric data of the person in front of the machine at the time of the tampering incident may allow for verification of a crime perpetrator. For example, it may be used to determine who acquired an instant win lottery ticket via a successful physical violation of the vending device and to flag the biometric of the perpetrator when at attempt is made to cash in the stolen ticket.

The system, thus, allows for placing lottery clerks under increased scrutiny, as the bulk of most lottery fraud is committed by clerks. This provides for increased consumer trust in the lottery as a whole. It further helps protect the patron against lost or stolen tickets by prevent bad actors from cashing in a stolen ticket and allowing a patron who loses a winning ticket a chance to redeem the prize without having physical possession of the ticket. The system further can deter underage gambling at both point of sale terminals and self-service vending machines. This prevents the lottery from bad publicity. Finally, by putting lottery vending machines under more scrutiny, it may be possible to biometrically identify tamperers or card skimmers.

Other Non-Lottery Applications

Figure 4:
FIG. 4 is an illustration of a panel including a rear-mounted camera in accordance with one or more embodiments.

As set forth in the attached claims, the scope of the present invention includes both combinations and sub-combinations of various features discussed herein, along with such variations and modifications as would occur to a person of skill in the art. The concepts described above applied may be applied in other contexts. For example, in the context of electronic gaming machines in a casino, a patron may associate his or her biometric data with a casino loyalty program and, thus, upon initiating operation of an electronic gaming machine, be automatically logged into such his or her account, have player preferences applied to the gaming session, etc. Such an electronic gaming machine may have an architecture similar to that of the lottery vending device of FIG. 2, wherein the camera(s) may be mounted, for example, in a panel attached to the cabinet of the gaming machine. FIG. 4 illustrates one example of a player tracking system panel containing a cutout for exposing rear-mounted camera 410. In other embodiments, support for filtered facial biometric tracking in a casino may also be extended to gaming tables.

Figure 5A:
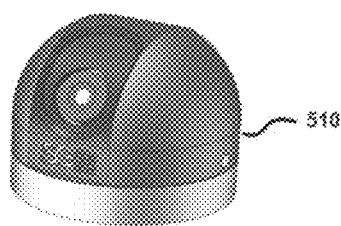
FIGS. 5A and 5B illustrate a gaming table-mounted camera in accordance with one or more embodiments.
Figure 5B:
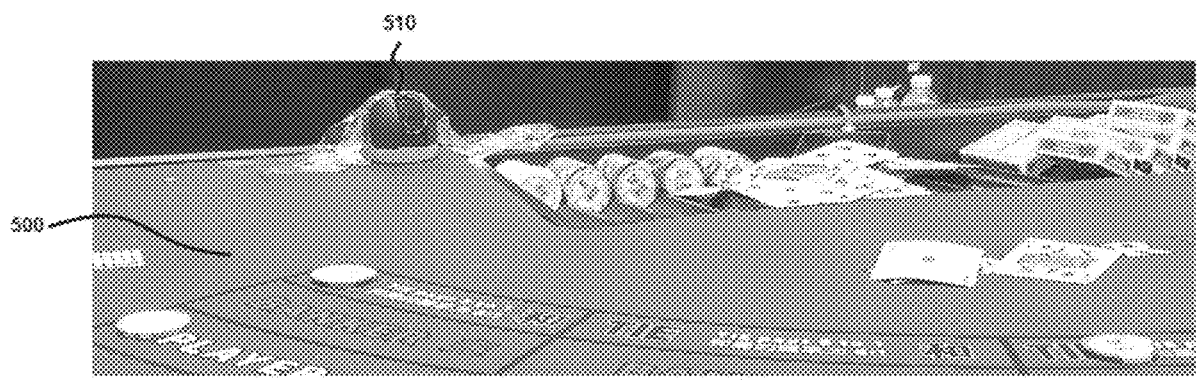

Similarly, as illustrated in FIGS. 5A and 5B, a facial recognition camera 510 may be mounted on a casino gaming table 500. As noted above, the streamed video camera image may be segmented into a set of polygons representing each patron position at the gaming table. Again, as described above, a center point for each polygon is defined, which may not be the mathematical center. Rather, it is where the optimal position of a nose on a face is for a person seated at a player's position at the table. In each image, the system counts the number of faces that have a nose position within each polygon. For each polygon, if there is only one face, that face is used. If there is more than one face, and one face is significantly nearer to the camera, that face is selected for use. If multiple faces are at similar distances, the face with the nose closest to the center point is selected for use. This serves to eliminate faces of observers who may be seated just behind patrons at the table, for example.

Any of the examples given about with respect to analytics, personalization and security may, thus, be equally applied to the casino gaming machine and table game environment. With respect to security, for example, gaming machine attendants and patrons may be associated with specific winning outcomes. For example, a large win on a gaming machine may be audited to see if there was any access to the gaming machine tampering by an attendant just prior to the win, whether the winner is an attendant, whether a payout ticket associated with the win is redeemed by the winner, etc. In another example, a player who loses a physical cashout ticket may be able to collect the value of the ticket by linking his or her facial biometrics at cashout time to facial biometrics obtained at the casino cage.

Any of the examples given about with respect to analytics, personalization and security may also be equally applied to other types of vending machines. For example, certain types of soft drink dispensers in fast food restaurants allow a patron to select from a plurality of base beverages and then select additional flavors to add to the selected base beverage. A system of the type described above could offer a recognized returning patron a first choice based on his or her previous selections at that vending machine or at any such vending machine with access to the biometric data associated with the patron.

Thus, the material particularly shown and described above is not meant to be limiting, but instead serves to show and teach various exemplary implementations of the present subject matter.

An example of a smart bin lottery ticket dispending system is disclosed in US2017/0018148A1, "Method and System for Enhanced Lottery Ticket Accounting and Sales with Smart Bin Dispensers at a Retail Establishment," incorporated herein in its entirety for all purposes. In addition to describing a smart bin dispenser similar to the Scientific Games SciQ™, relevant external system elements (as in the present FIG. 1, element 60) in a lottery environment are disclosed.

In accordance with one or more embodiments related to the application of biometric data in a casino environment, U.S. Pat. No. 9,177,193, entitled "Safe Illumination for Computerized Facial Recognition" is incorporated herein by reference in its entirety for all purposes. Electronic gaming machines augmented with the above-described invention may, or may not, include the infrared illumination described in the '193 patent. Rather, in addition to the detail provided herein, the '193 patent discloses such electronic gaming machines and their operating environment and external systems in general.

Similarly, U.S. Pat. No. 8,972,299, entitled "Methods for Biometrically Identifying a Player," also incorporated herein in its entirety for all purposes, provides further insights into casino network infrastructure, player tracking systems, player preferences and the application of biometrics in a casino environment.

The invention claimed is:
1. A method of operating a vending device comprising a processor, a memory and a camera for providing a video stream of images to the processor, the method comprising:
providing at least one video stream of images from the camera to a facial recognition unit;
detecting with the facial recognition unit at least one face from a plurality of faces in the video stream of images;
selecting the one face from the plurality of faces;
for the selected face:
determining with the processor a distance of the selected face to the camera and rejecting the selected face if the distance exceeds a predetermined distance;
receiving from the camera a succession of images of the selected face from the video stream and determining with the processor, by analysis of the succession of images, whether the selected face is present for more than a predetermined period of time and rejecting the selected face if the selected face is present for less than the predetermined period of time;
determining with the processor a respective quality rating for each of a plurality of images of the selected face gathered from the succession of images of the video stream;
selecting with the processor a best image from the plurality of images according to their respective quality ratings;
matching with the processor the best image against a plurality of images stored in the memory and stored quality ratings;

if a match is obtained, using the processor to compare the quality rating of the best image with a quality rating of the stored image;
if the quality rating of the best image exceeds the quality rating of the stored image, replacing within the memory the stored image and stored quality rating with the best image and its quality rating.

2. The method of claim 1 wherein determining the respective quality rating for each of the plurality of images comprises evaluating the pose of the selected face in each of the plurality of images.

3. The method of claim 1 wherein determining the respective quality rating for each of the plurality of images comprises detecting positions of landmarks on the selected face against a reference model of a human head and counting the number of landmarks detected in each of the plurality of images.

4. The method of claim 1 wherein determining the respective quality rating for each of the plurality of images comprises determining the distance from the camera of the selected face in each of the plurality of images.

5. The method of claim 1 wherein determining the respective quality rating for each of the plurality of images comprises determining the sharpness of the selected face in each of the plurality of images.

6. A method for collecting and using facial biometric data in association with the vending of a product or service from a machine comprising:
providing a machine accessible to a select public for dispense of a product or service; associating a camera with the machine for capturing a video stream of images; and relaying the images to a facial recognition unit;
analyzing the video stream of images for the presence of faces with the facial recognition unit; and using a computer processor, determining a distance between each image of a detected face and the camera; and further identifying potentially acceptable facial images by analyzing the images against predetermined criteria;
generating biometric data for each acceptable facial image and associating a quality rating via the computer processor to each acceptable facial image; identifying a best facial image collected for a given face by selecting the best quality rating from the plurality of acceptable facial images associated with the given face;
accessing computer memory for retrieval of a previously stored facial image correlating to the given face; comparing with the computer processor any stored facial image to the best facial image; and updating the computer memory with a new stored facial image if it has a better quality rating than the stored facial image; and
dispensing of the product or performing the service based at least in part upon the given face meeting suitable benchmarks programmed into the machine.

7. The method of claim 6 wherein analyzing for the presence of faces includes classifying each detected face as transient or non-transient based at least in part upon any of a calculated distance from the machine or a length of time the facial image was captured.

8. The method of claim 7 wherein the non-transient face is further categorized as known or unknown based at least in part upon whether the facial image corresponds to at least one of the previously stored facial images.

9. The method of claim 6 further comprising analyzing with the processor the facial images collected by the camera and compiling analytical data.

10. The method of claim 9 wherein compiling analytical data includes any of determining locations of patron congregation with respect to the machine, whether such locations hinder access to the machine, how many patrons per time period engage with the machine, foot traffic overall, and analyzing the data for any combination of time, gender and approximate age.

11. The method of claim 6 further comprising displaying advertisements with a display associated with the machine correlating to a desired outcome or population based upon analyzing of the data collected.

12. The method of claim 6 further comprising linking a player loyalty identification with the stored image.

13. The method of claim 12 wherein dispensing the product or service automatically registers a transaction into a loyalty program associated with a patron linked to the stored image.

14. The method of claim 6 further comprising offering a specific product or service based upon identifying a repeat pattern of behavior associated with a patron linked to a specific stored image.

15. The method of claim 6 further including dispensing of a lottery ticket.

16. The method of claim 6 further comprising storing biometric information associated with a purchase of the lottery ticket; enabling redemption of any potential prize amount by a patron attempting to redeem the ticket by capturing an image of a patron at the time of attempted redemption; comparing the captured image with that of the stored biometric information; and flagging an alert should the image of the patron not match the stored biometric information.

17. The method of claim 6 wherein generating biometric data includes analyzing an approximate age of a patron; requiring human intervention to complete a transaction if the patron is flagged as outside an acceptable age; and temporarily disabling the machine from use without such human intervention.

18. A machine for enabling dispense of a gaming product comprising:
a camera for capturing a video stream of images of activity occurring proximate to the machine;
a facial recognition unit in communication with the camera for receiving images from the camera, analyzing the images for the presence of faces, and identifying which of said images qualify as detected faces;
a computer processor for determining a distance between each image of a detected face and the camera; and further identifying potentially acceptable facial images by analyzing the images against predetermined criteria; generating biometric data for each acceptable facial image and associating a quality rating to each acceptable facial image; and identifying a best facial image collected for a given face by selecting the best quality rating from the plurality of acceptable facial images associated with the given face;
a computer memory for storage and retrieval of the biometric data and quality rating associated with faces; and
a dispenser for dispensing the product based at least in part upon the given face meeting suitable benchmarks programmed into the machine.

19. The machine of claim 18 wherein the product is a lottery ticket.

20. The machine of claim 18 wherein the computer processor updates the computer memory with a new stored facial image if it has a better quality rating than the stored facial image.

* * * * *